US010302131B2

(12) United States Patent
Koganei et al.

(10) Patent No.: US 10,302,131 B2
(45) Date of Patent: May 28, 2019

(54) TAPERED ROLLER BEARING

(71) Applicant: NSK LTD., Tokyo (JP)

(72) Inventors: Makoto Koganei, Fujisawa (JP);
Daisuke Tominaga, Fujisawa (JP);
Hiroshi Sakamoto, Fujisawa (JP);
Shunichi Kiyono, Fujisawa (JP);
Mamoru Aoki, Fujisawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 15/692,028

(22) Filed: Aug. 31, 2017

(65) Prior Publication Data

US 2017/0363146 A1  Dec. 21, 2017

Related U.S. Application Data

(63) Continuation of application No. 15/446,245, filed on Mar. 1, 2017, now abandoned, which is a
(Continued)

(30) Foreign Application Priority Data

Dec. 25, 2012  (JP) ................................. 2012-280994
Apr. 4, 2013  (JP) ................................. 2013-078999
Nov. 21, 2013  (JP) ................................. 2013-241278

(51) Int. Cl.
*F16C 33/36*  (2006.01)
*F16C 33/58*  (2006.01)
(Continued)

(52) U.S. Cl.
CPC ........ *F16C 33/4605* (2013.01); *F16C 19/364* (2013.01); *F16C 33/4635* (2013.01);
(Continued)

(58) Field of Classification Search
CPC .... F16C 19/364; F16C 19/383; F16C 19/385; F16C 19/386; F16C 33/366;
(Continued)

(56) References Cited

U.S. PATENT DOCUMENTS 1,784,914 A * 12/1930 Strickland ............. F16C 19/364
384/475
2,059,181 A  10/1936 Wilson
(Continued)

FOREIGN PATENT DOCUMENTS

CN  101040125 A  9/2007
CN  101371056 A  2/2009
(Continued)

OTHER PUBLICATIONS

Communication dated Dec. 20, 2017, issued by the USPTO in counterpart U.S. Appl. No. 15/499,289.
(Continued)

*Primary Examiner* — Phillip A Johnson
(74) *Attorney, Agent, or Firm* — Sughrue Mion, PLLC

(57) ABSTRACT

A tapered roller bearing (1) is includes an outer ring (2) having an outer ring raceway surface (2*a*) on the inner peripheral surface thereof, an inner ring (3) having an inner ring raceway surface (3*a*) on the outer peripheral surface thereof, and a plurality of tapered rollers (4) arranged in a rollable manner between the outer ring raceway surface (2*a*) and the inner ring raceway surface (3*a*). A large flange (3*b*) is formed on an end portion of the inner ring (3) on a large-diameter side of the inner ring, and the inner ring raceway surface (3*a*) continuously extends to the end face (3*c*) of the inner ring (3) on a small-diameter side of the inner ring. The contact angle ($\alpha$) is 37°30' to 50°. In this manner, the tapered roller bearing having high moment rigidity and long life can be provided.

8 Claims, 13 Drawing Sheets

Related U.S. Application Data continuation of application No. 14/652,267, filed as application No. PCT/JP2013/084751 on Dec. 25, 2013, now abandoned.

(51) Int. Cl.
  *F16C 33/46* (2006.01)
  *F16C 19/36* (2006.01)
  *F16C 33/66* (2006.01)
  *F16C 43/06* (2006.01)

(52) U.S. Cl.
  CPC ........ *F16C 33/4676* (2013.01); *F16C 33/583* (2013.01); *F16C 33/585* (2013.01); *F16C 33/586* (2013.01); *F16C 33/6614* (2013.01); *F16C 33/6651* (2013.01); *F16C 43/065* (2013.01); *F16C 2240/30* (2013.01); *F16C 2240/34* (2013.01); *F16C 2240/70* (2013.01); *F16C 2361/61* (2013.01)

(58) Field of Classification Search
  CPC ............... F16C 33/4635; F16C 33/467; F16C 33/4676; F16C 33/498; F16C 33/585; F16C 2240/70
  See application file for complete search history.

(56) References Cited

U.S. PATENT DOCUMENTS

| | | | |
|---|---|---|---|
| 3,477,773 A | 11/1969 | Alton | |
| 3,578,828 A | 5/1971 | Orkin et al. | |
| 3,733,111 A | 5/1973 | Harlan et al. | |
| 4,065,191 A | 12/1977 | Kelstrom | |
| 4,222,620 A | 9/1980 | Mirring | |
| 4,317,601 A | 3/1982 | Faigley, Jr. | |
| 4,425,011 A | 1/1984 | Cunningham et al. | |
| 4,472,006 A | 9/1984 | Goransson et al. | |
| 4,523,862 A | 6/1985 | Yasui et al. | |
| 5,009,525 A * | 4/1991 | Brockmuller | F16C 19/26 384/576 |
| 5,096,075 A | 3/1992 | Glover | |
| 5,267,840 A | 12/1993 | Snow et al. | |
| 5,397,184 A | 3/1995 | Murai | |
| 5,669,719 A | 9/1997 | Kinno et al. | |
| 6,135,643 A | 10/2000 | Hattori et al. | |
| 6,146,045 A | 11/2000 | Maughan | |
| 6,502,307 B2 | 1/2003 | Komaba et al. | |
| 7,150,565 B1 * | 12/2006 | Koyama | F16C 19/26 384/450 |
| 7,722,257 B2 | 5/2010 | Tabata et al. | |
| 7,955,001 B2 | 6/2011 | Reed et al. | |
| 8,083,598 B2 | 12/2011 | Yamamoto et al. | |
| 8,342,769 B2 | 1/2013 | Elterman et al. | |
| 8,382,380 B2 | 2/2013 | Nakamizo et al. | |
| 8,636,414 B1 | 1/2014 | Van Dyke | |
| 9,834,038 B2 | 12/2017 | Chung | |
| 2002/0051594 A1 | 5/2002 | Takehara et al. | |
| 2002/0102041 A1 | 8/2002 | Matsuyama et al. | |
| 2005/0069239 A1 | 3/2005 | Yamamoto et al. | |
| 2007/0269157 A1 | 11/2007 | Fahrni et al. | |
| 2008/0096715 A1 | 4/2008 | Ono | |
| 2009/0003747 A1 | 1/2009 | De Mul | |
| 2009/0074345 A1 | 3/2009 | Omoto | |
| 2009/0272833 A1 | 11/2009 | Wahl | |
| 2011/0123143 A1 | 5/2011 | Lee et al. | |
| 2011/0142389 A1 | 6/2011 | Takeuchi et al. | |
| 2012/0306173 A1 | 12/2012 | Meitinger et al. | |
| 2013/0004113 A1 | 1/2013 | Ueno | |

FOREIGN PATENT DOCUMENTS

| | | | |
|---|---|---|---|
| CN | 102072255 A | 5/2011 | |
| CN | 202108870 U | 1/2012 | |
| CN | 202165427 U | 3/2012 | |
| CN | 102834631 A | 12/2012 | |
| DE | 102010035062 A1 | 2/2012 | |
| DE | 10 2011 004 210 A1 | 8/2012 | |
| EP | 1408248 A2 | 4/2004 | |
| EP | 1 426 639 A1 | 6/2004 | |
| EP | 1 519 058 A2 | 3/2005 | |
| EP | 2 787 224 A2 | 10/2014 | |
| GB | 2 115 889 A | 9/1983 | |
| JP | 56-101417 A | 8/1981 | |
| JP | 58-165324 U | 11/1983 | |
| JP | 58165324 U | 11/1983 | |
| JP | 59-50224 A | 3/1984 | |
| JP | 61-096216 A | 5/1986 | |
| JP | 63-001055 Y | 1/1988 | |
| JP | 1-75621 U | 5/1989 | |
| JP | 03-089219 U1 | 9/1991 | |
| JP | 06-032747 U | 4/1994 | |
| JP | 09-4688 A | 1/1997 | |
| JP | 2000-130443 A | 5/2000 | |
| JP | 2002-48146 A | 2/2002 | |
| JP | 3699249 B2 | 9/2005 | |
| JP | 2007-024110 A | 2/2007 | |
| JP | 2007-40520 A | 2/2007 | |
| JP | 200724110 A | 2/2007 | |
| JP | 200732679 A | 2/2007 | |
| JP | 2007-127269 A | 5/2007 | |
| JP | 2007255569 A | 10/2007 | |
| JP | 2008-163999 A | 7/2008 | |
| JP | 2008-180246 A | 8/2008 | |
| JP | 2008-298230 A | 12/2008 | |
| JP | 2008291921 A * | 12/2008 | .......... F16C 33/4635 |
| JP | 2008291921 A | 12/2008 | |
| JP | 2010-25155 A | 2/2010 | |
| JP | 201048342 A | 3/2010 | |
| JP | 2010174918 A | 8/2010 | |
| JP | 2010174918 A * | 8/2010 | .......... F16C 33/6681 |
| JP | WO 2011129178 A1 | 8/2011 | |
| JP | 2012-177429 A | 9/2012 | |
| JP | 2012225492 A | 11/2012 | |
| JP | 2012-241873 A | 12/2012 | |
| JP | 2012241873 A | 12/2012 | |
| JP | 5397505 B2 | 1/2014 | |
| KR | 10-2011-0015672 A | 2/2011 | |
| WO | 2010005007 A1 | 1/2010 | |
| WO | 2012/031815 A1 | 3/2012 | |
| WO | 2013/051422 A1 | 4/2013 | |

OTHER PUBLICATIONS

Communication dated Jun. 28, 2016 issued by Japanese Intellectual Property Office in counterpart Japanese Application No. 2013-267846.
Communication from United States Patent and Trademark Office dated Nov. 2, 2016, in U.S. Appl. No. 14/781,804.
Communication dated Feb. 16, 2016 by the European Patent Office in counterpart Patent Application No. 14780378.7.
Communication dated Feb. 16, 2016, issued by the European Patent Office in counterpart European Patent Application No. 13868365.1.
Communication dated Jun. 10, 2016, issued by the Korean Intellectual Property Office in counterpart Korean Patent Application No. 10-2015-7016572.
Communication dated Sep. 9, 2016, by the Chinese Patent Office in counterpart Chinese Patent Application No. 201380059649.4.
First Office Action dated Jan. 24, 2017 in Chinese Patent Application No. 201480020018.6 with translation.
International Search Report dated Jul. 1, 2014, issued by the International Searching Authority in counterpart International Application No. PCT/JP2014/059939.
International Search Report dated Mar. 11, 2014, issued by the International Searching Authority in counterpart International Application No. PCT/JP2013/084751.
Morton; Hudson, T. "Anti-Friction Bearings" , Second Edition, p. 222-223.
Search Report dated Jul. 1, 2014, issued by the International Searching Authority in counterpart International Application No. PCT/JP2014/059939 (PCT/ISA/210).

(56) References Cited

OTHER PUBLICATIONS

Written Opinion dated Jul. 1, 2014, issued by the International Searching Authority in counterpart International Application No. PCT/JP2014/059939.

Written Opinion dated Jul. 1, 2014, issued by the International Searching Authority in counterpart International Application No. PCT/JP2014/059939 (PCT/ISA/237).

Written Opinion Mar. 11, 2014 issued by the International Searching Authority in counterpart International Application No. PCT/JP2013/084751.

Communication issued by the Japanese Patent Office dated Oct. 24, 2017 in counterpart Japanese Patent Application No. 2013-267847.

Extended European Search Report dated Oct. 11, 2018 issued by the European Patent Office in counterpart European Application No. 18181696.8.

\* cited by examiner

TAPERED ROLLER BEARING

CROSS-REFERENCE TO RELATED APPLICATIONS

This is a continuation of U.S. patent application Ser. No. 15/446,245, filed Mar. 1, 2017 (pending), which is a continuation of U.S. patent application Ser. No. 14/652,267, filed Jun. 15, 2015 (abandoned), which is a 371 National Stage Entry of PCT/JP2013/084751, filed Dec. 25, 2013, which claims benefit of priority to Japanese Patent Applications Nos. 2012-280994, filed Dec. 25, 2012, 2013-078999, filed Apr. 4, 2013, and 2013-241278, filed Nov. 21, 2013. The entire disclosures of the prior applications are considered part of the disclosure of the accompanying continuation application, and are hereby incorporated by reference.

TECHNICAL FIELD

The present invention relates to tapered roller bearings, in particular, to tapered roller bearings suitable for use in automobiles, railway vehicles, construction machinery, joints for industrial robots, machine tools, conveyors, assembly equipment or the like.

BACKGROUND ART

Conventionally, an angular ball bearing is considered as a rolling bearing to be selected in cases where moment rigidity is required.

As tapered roller bearings, there is known a tapered roller bearing in which protrusions are provided on opening edges of pockets on an outer peripheral side and an inner peripheral side of a cage so that rollers are integrated with the cage to prevent rollers from falling out when assembling or during use of the bearing, and a smaller flange on an inner ring is made unnecessary so that the roller are made longer correspondingly to increase load capacity (see, e.g., Patent Document 1).

PRIOR ART DOCUMENT

Patent Document

Patent Document 1: JP 2007-32679 A

SUMMARY OF INVENTION

Problem to be Solved by Invention

However, in angular ball bearings, a bearing size becomes so large to meet requirements of higher moment rigidity and longer life that there is a limit in addressing requirements of maintaining or reducing the bearing size. Further, with regard to bearings for use in transmissions, recent requirements are bearings with higher load capacity and can downsize a transmission, i.e., having functions that are at least equivalent to those of conventional ones without changing a bearing size.

As for the tapered roller bearing disclosed in Patent Document 1, a contact angle is not being considered, and it appears that, with the contact angle of the tapered roller bearing illustrated in the drawings thereof, radial rigidity is high, but high moment rigidity cannot be provided. Also, in Patent Document 1, there is no consideration on insertability of rollers into the cage. In addition, according to the cage used in the tapered roller bearing disclosed in Patent Document 1, the rollers and the cage are integrated, but there is no disclosure with respect to an overlap width for retaining the tapered rollers, and therefore, it is unclear as to whether retainability of tapered rollers is sufficient. Further, the contact angle of the tapered roller bearing is smaller than 35°, and if the contact angle is set to be 35° or more, there is a concern that rollers may not be sufficiently retained only by the cage because the inner ring does not have a smaller flange.

In addition, as shown in FIG. 13 as a reference example, when a large flange $103a$ of an inner ring 103 of a tapered roller bearing has an inclined surface $103b$, the inclined surface $103b$ may surface-contact with the cage, and may damage the cage due to insufficient strength of the cage. Also, because a flange surface $103c$ of the large flange of the inner ring has a function of backing up the tapered rollers, the flange surface $103c$ always contacts the roller end faces, which may break an oil film to cause lubrication failure.

The present invention has been made in view of the above problems, and it is an object thereof to provide a tapered roller bearing with high moment rigidity and long life.

Means for Solving the Problem

The above object of the present invention is achieved by the following configurations.

(1) A tapered roller bearing including an inner ring having an inner ring raceway surface on an outer peripheral surface thereof, an outer ring having an outer ring raceway surface on an inner peripheral surface thereof, and a plurality of tapered rollers arranged in a rollable manner between the inner ring raceway surface and the outer ring raceway surface, wherein the inner ring has a large flange formed on an end portion of the inner ring on a large-diameter side of the inner ring, and the inner ring raceway surface continuously extends to an end face of the inner ring on a small-diameter side of the inner ring, and wherein the contact angle $\alpha$ is 45°.

(2) A tapered roller bearing including an outer ring having an outer ring raceway surface on an inner peripheral surface thereof, an inner ring having an inner ring raceway surface on an outer peripheral surface thereof, and a plurality of tapered rollers arranged in a rollable manner between the outer ring raceway surface and the inner ring raceway surface, wherein the inner ring has a large flange formed on an end portion of the inner ring on a large-diameter side of the inner ring, and the inner ring raceway surface continuously extends to an end face of the inner ring on a small-diameter side of the inner ring, and wherein the contact angle $\alpha$ is 37°30' to 50°.

(3) The tapered roller bearing according to (1) or (2), wherein a ratio between a height $(D1-d)/2$ of the inner ring on the large flange side and a radial cross-section thickness H is set such that $0.7<(D1-d)/2H<0.9$, where d is an inner diameter of the tapered roller bearing and D1 is an outer diameter of the inner ring.

(4) The tapered roller bearing according to any one of (1) to (3), wherein a ratio between a roller length Lw and a width B of the inner ring is set such that $0.8<Lw/B<1.2$.

(5) The tapered roller bearing according to any one of (1) to (4), wherein a ratio between a radial cross-section thickness H and the inner diameter d is set such that $0.05<H/d<0.15$.

(6) The tapered roller bearing according to any one of (1) to (5), wherein a ratio between a diameter $Dw1$ of each tapered roller on a large-diameter side of each tapered roller and a radial cross-section thickness H is $0.3<Dw1/H<0.6$.

(7) The tapered roller bearing according to any one of (1) to (6), further including a resin cage, the cage including a large-diameter ring portion, a small-diameter ring portion, the large-diameter ring portion and the small-diameter ring portion being spaced from each other in an axial direction, and a plurality of pillar portions connecting the large-diameter ring portion and the small-diameter ring portion to each other, thereby forming a plurality of pockets for accommodating and retaining the plurality of tapered rollers, in which at least one of an inner peripheral surface of the large-diameter ring portion and an outer peripheral surface of the small-diameter ring portion is formed with an annular notch such that a thickness of the ring portion is smaller than a thickness of each pillar portions.

(8) The tapered roller bearing according to (7), wherein the annular notch is formed on the inner peripheral surface of the large-diameter ring portion, and wherein the large flange is arranged to extend into the annular notch.

(9) The tapered roller bearing according to any one of (1) to (8), further including a resin cage, the cage including a large-diameter ring portion, a small-diameter ring portion, the large-diameter ring portion and the small-diameter ring portion being spaced from each other in an axial direction, and a plurality of pillar portions connecting the large-diameter ring portion and the small-diameter ring portion to each other, thereby forming a plurality of pockets for accommodating and retaining the plurality of tapered rollers, wherein the pillar portions are formed such that, in at least a part of a radially inner side of each pocket, an overlap width is 0.2 mm to 0.7 mm so that an opening width of each pocket on the radially inner side is smaller than the diameter of each tapered roller on the large-diameter side of each tapered roller; and such that, in at least a part of a radially outer side of each pocket, an overlap width is 0.1 mm to 0.5 mm so that an opening width of each pocket on the radially outer side is smaller than a diameter of each tapered roller on a small-diameter side of each tapered roller.

(10) The tapered roller bearing according to any one of (1) to (6), further including a resin cage, the cage including a large-diameter ring portion, a small-diameter ring portion, the large-diameter ring portion and the small-diameter ring portion being spaced from each other in an axial direction, and a plurality of pillar portions connecting the large-diameter ring portion and the small-diameter ring portion to each other, thereby forming a plurality of pockets for accommodating and retaining the plurality of tapered rollers, wherein an inclination angle of the cage is equal to or greater than 32°30' but smaller than 55°.

(11) The tapered roller bearing according to any one of (7) to (9), wherein an inclination angle of the cage is equal to or greater than 32°30' but smaller than 55°.

(12) The tapered roller bearing according to any one of (1) to (12), wherein the large flange has a recessed portion at a location facing the cage.

(13) The tapered roller bearing according to (12), wherein the recessed portion is formed between a flange surface of the large flange that contacts a larger end face of each tapered roller and a radially outer surface of the large flange having a diameter larger than a diameter of the flange surface of the large flange at a radially outermost point on the flange surface of the large flange, and is formed by a curved surface, a stepped surface, or a combination of the curved surface and the stepped surface.

(14) The tapered roller bearing according to (13), wherein a generatrix shape of the recessed portion is formed by a single arc or a plurality of arcs.

(15) The tapered roller bearing according to (14), wherein the recessed portion is formed axially inward of a virtual plane, the virtual plane being perpendicular to a rotation axis of the tapered roller bearing and including an edge line at which the recessed portion and the radially outer surface of the large flange meet each other.

(16) The tapered roller bearing according to (14) or (15), wherein the generatrix shape of the recessed portion is formed by a single arc, a curvature radius r of which being $r \geq (D1-D2)/2$, wherein D1 is the diameter of the radially outer surface of the large flange and D2 is the diameter of the flange surface of the large flange at the radially outermost point.

(17) The tapered roller bearing according to (13), wherein the stepped surface has a cylindrical surface near the flange surface of the large flange and an annular flat surface near the radially outer surface of the large flange and extending radially outward from the cylindrical surface.

(18) A tapered roller bearing including an outer ring having an outer ring raceway surface on an inner peripheral surface thereof, an inner ring having an inner ring raceway surface on an outer peripheral surface thereof, a plurality of tapered rollers arranged in a rollable manner between the outer ring raceway surface and the inner ring raceway surface, and a resin cage forming a plurality of pockets to accommodate and to retain the plurality of tapered rollers, wherein the cage includes a large-diameter ring portion and a small-diameter ring portion, the large-diameter ring portion and the small-diameter ring portion being spaced from each other in an axial direction, and a plurality of pillar portions connecting the large-diameter ring portion and the small-diameter ring portion to each other, and wherein at least one of an inner peripheral surface of the large-diameter ring portion and an outer peripheral surface of the small-diameter ring portion is formed with an annular notch such that a thickness of the ring portion is smaller than a thickness of each pillar portion.

(19) The tapered roller bearing according to (18), wherein the inner peripheral surface of the large-diameter ring portion is formed with the annular notch such that the thickness of the large-diameter ring portion is smaller than the thickness of each pillar portion, wherein the inner ring has a large flange formed on an end portion of the inner ring on a large-diameter side of the inner ring, and the inner ring raceway surface continuously extends to an end face of the inner ring on a small-diameter side of the inner ring, and wherein the large flange is arranged to extend into the annular notch.

(20) The tapered roller bearing according to (18) or (19), wherein the pillar portions are formed such that, in at least a part of a radially inner side of each pocket, an overlap width is 0.2 mm to 0.7 mm so that an opening width of each pocket on the radially inner side is smaller than a diameter of each tapered roller on a large-diameter side of each tapered roller, and such that, in at least a part of a radially outer side of each pocket, an overlap width is 0.1 mm to 0.5 mm so that an opening width of each pocket on the radially outer side is smaller than a diameter of each tapered roller on a small-diameter side of each tapered roller.

(21) The tapered roller bearing according to (18), wherein the inner ring has a large flange formed on an end portion of the inner ring on a large-diameter side of the inner ring, and the inner ring raceway surface continuously extends to an end face of the inner ring on a small-diameter side of the inner ring, and wherein the contact angle α is 37°30' to 50°.

(22) The tapered roller bearing according to (21), wherein the contact angle α is 45°.

(23) The tapered roller bearing according to any one of (18) to (22), wherein an inclination angle of the cage is equal to or greater than 32°30' but smaller than 55°.

Effects of Invention

According to the tapered roller bearing of the present invention, because the inner ring has the large flange formed on the end portion of the inner ring on the large-diameter side of the inner ring, and the inner ring raceway surface continuously extends to the end face of the inner ring on the small-diameter side of the inner ring, the roller length made as long as possible to have increased load capacity, thereby achieving high moment rigidity and long life. Also, the contact angle α is 45°, thereby further enhancing moment rigidity. The contact angle α is set to be in a range of 37°30' to 50° to enhance the moment rigidity, and if the contact angle α is set to be in a range of 37°30' to 50° when a distance between bearings is short, in particular a distance between bearings is equal to or smaller than four times of an assembly width T of bearings, this is especially effective in enhancing the moment rigidity of bearings because a distance between application points can be made long.

Further, according to the tapered roller bearing of the present invention, because the inner ring has the large flange formed on the end portion of the inner ring on the large-diameter side of the inner ring, and the large flange has the recessed portion at a location facing the cage, an interference between the large flange and the cage can be prevented to inhibit damage of the cage due to wear thereof, and also, lubricant can be held in the recessed portion to improved lubrication on the flange surface of the large flange of the inner ring. In addition, because the recessed portion is provided on the large flange, a thickness of the large-diameter ring portion of the cage can be maximally increased, thereby enhancing strength of the cage.

In addition, according to the tapered roller bearing of the present invention, because at least one of the inner peripheral surface of the large-diameter ring portion of the cage and the outer peripheral surface of the small-diameter ring portion thereof is formed with the annular notch such that the thickness of the ring portion is smaller than the thickness of each pillar portion, insertability of the tapered rollers into the cage is improved.

EMBODIMENTS OF INVENTION

A tapered roller bearing according to each of embodiments of the present invention will be now described in detail based on the accompanying drawings.

First Embodiment

Figure 1A:
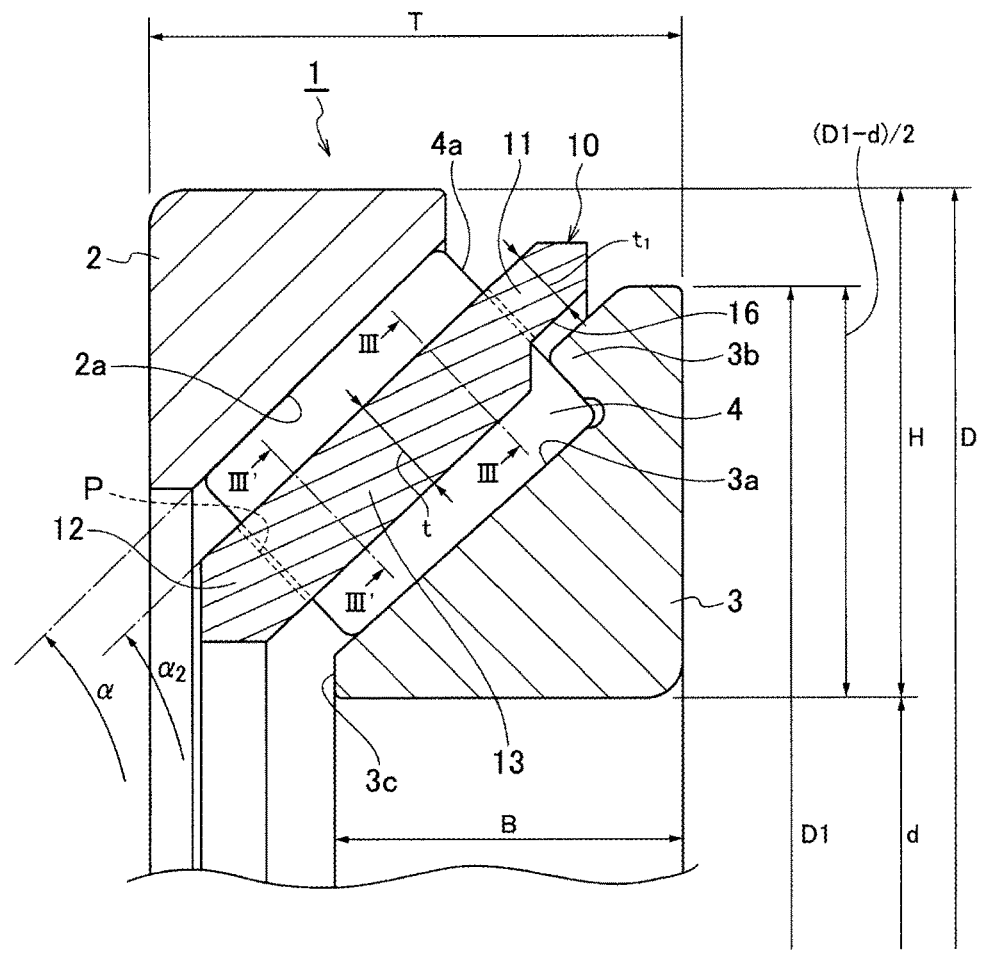
FIG. 1A is a sectional view of a tapered roller bearing according to a first embodiment of the present invention and FIG. 1B is a view showing a tapered roller.
Figure 1B:
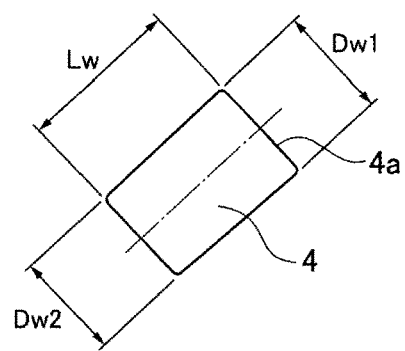

As shown in FIG. 1, a tapered roller bearing 1 of a first embodiment has an outer ring 2 having an outer ring raceway surface 2a on an inner peripheral surface thereof, an inner ring 3 having an inner ring raceway surface 3a on an outer peripheral surface thereof, a plurality of tapered rollers 4 arranged in a rollable manner between the outer ring raceway surface 2a and the inner ring raceway surface 3a, and a resin cage 10 forming a plurality of pockets P to accommodate and to retain the plurality of tapered rollers 4 at given intervals.

The outer ring raceway surface 2a formed on the outer ring 2 is provided on the inner peripheral surface of the outer ring 2 in such a manner that an inner diameter thereof is progressively increased as going from an small-diameter side thereof toward a large-diameter side.

The inner ring 3 has a large flange 3b formed on an end portion of the inner ring on a large-diameter side of the inner ring to protrude radially outward, and the inner ring raceway surface 3a is provided to continuously extend to an end face 3c on the small-diameter side such that an outer diameter thereof is gradually increased from the end face 3c on the small-diameter side toward the large flange 3b.

As shown in FIG. 1, the tapered roller bearing 1 of the present embodiment is designed such that a contact angle α is 45°, the contact angle α being defined by a tangent line to the outer ring raceway surface 2a and a rotation axis of the tapered roller bearing 1, so as to improve moment rigidity. In addition, the moment rigidity can be enhanced by setting the contact angle α to be in a range of 37°30' to 50° and if the contact angle α is set to be in a range of 37°30' to 50° when a distance between bearings is short, in particular a distance between bearings is equal to or smaller than four times of an assembly width T of bearings, this is especially effective in enhancing the moment rigidity of bearings because a distance between application points can be made long.

The tapered roller bearing 1 is designed such that a ratio between the radial cross-section thickness H and the inner diameter d is 0.05<H/d<0.15, providing a compact structure having a thin radial thickness even with a large contact angle α of 45°.

In addition, because the smaller flange is not provided, the roller length Lw can be made long, so that a ratio between the roller length Lw and the width B of the inner ring is set such that 0.8<Lw/B<1.2, whereby load capacity is increased to improve moment rigidity and to achieve long life. Also, a ratio between the diameter Dw1 of the roller on a large-diameter side of the roller and the radial cross-section thickness H is set such that 0.3<Dw1/H<0.6.

Further, with D1 being the outer diameter of the inner ring, it is designed such that a ratio between the height (D1−d)/2 of the inner ring on the large flange side and the radial cross-section thickness H is 0.7<(D1−d)/2H<0.9, and thus the large flange 3b can be backed up, thereby greatly enhancing strength of the large flange 3b. Here, if (D1−d)/2H≥1, the outer diameter of the large flange is larger than the outer diameter of the outer ring, and therefore the large flange contacts the housing. Accordingly, considering an interference with the housing, the height of the large flange needs to be designed such that (D1−d)/2<H, i.e., (D1−d)/2H<1. Also, if considering margins for inclination, deformation, movement amount and the like of the bearing, the height is preferably set such that (D1−d)/2H<0.9. In addition, because the large flange could be lacking in strength if (D1−d)/2H≤0.7, the height is preferably set such that (D1−d)/2H>0.7. In FIG. 1, T represents an assembly width of the tapered roller bearing and D represents an outer diameter of the tapered roller bearing. Also, as the tapered roller bearing 1 applied to the present embodiment, ones typically having a bearing inner diameter of 30 to 500 mm and a bearing outer diameter of 33 to 650 mm are employed. Thus, because such a bearing size is smaller than that of a main shaft for a wind power generator, the tapered rollers are small in size and also light in weight. For this reason, it is suitable that a unitary resin cage as in the present invention is employed for the tapered roller bearing 1.

Figure 2A:
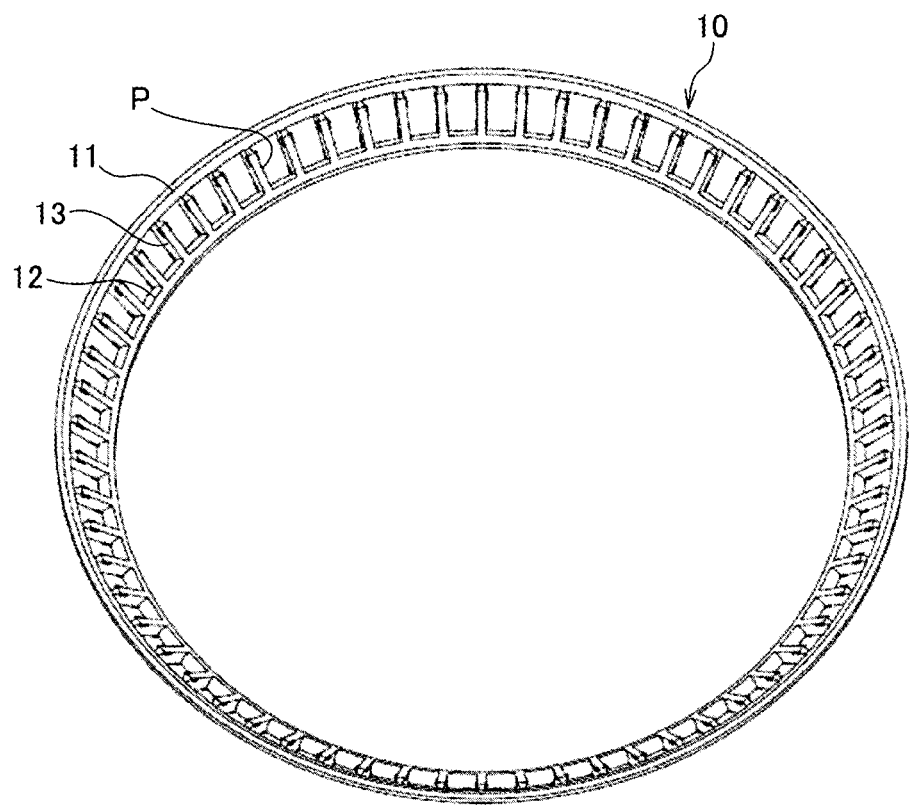
FIG. 2A is an overall perspective view of a cage in FIG. 1
Figure 2B:
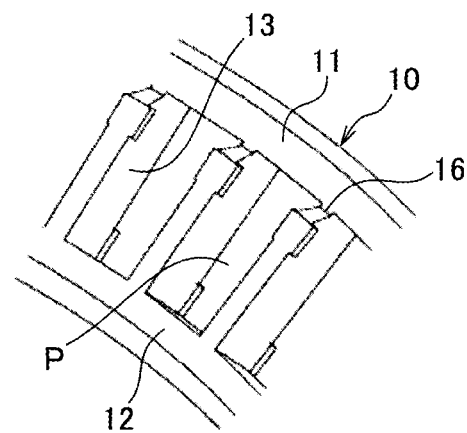
FIG. 2B is a partially enlarged view of FIG. 2A.

Also, as shown in FIGS. 1 and 2, the resin cage 10 has a large-diameter ring portion 11 and a small-diameter ring portion 12, the large-diameter ring portion 11 and the small-diameter ring portion 12 being spaced from each other in an axial direction, and a plurality of pillar portions 13 provided at given intervals in a circumferential direction and connecting the large-diameter ring portion 11 and the small-diameter ring portion 12 to each other. The resin cage 10 is fabricated by injection-molding and particularly preferably injection-molded using an axial draw mold, which is advantageous in cost.

As a base resin used in a resin composition usable for the cage 10, a thermoplastic resin having a heat resistance at or above a certain level can be used. In addition, in order to satisfy a fatigue resistance and a low water absorption dimension change required as the cage 10, a crystalline resin is suitable, and in particular polyamide 46, polyamide 66, aromatic polyamide resin, polyphenylene sulfide (PPS) resin, polyether ether ketone (PEEK) resin and the like can be used. As aromatic polyamide resin, modified polyamide 6T such as polyamide 6T/6I, polyamide MXD6, polyamide 9T, and polyamide 4T can be used. In the base resins described above, polyphenylene sulfide (PPS) resin and polyether ether ketone (PEEK) resin, which have little water absorption dimensional change, are particularly suitable.

Also, the resin composition contains a reinforcing fiber material for achieving strength at or above a certain level and inhibiting changes in linear expansion coefficient/water absorption dimension. As the reinforcing fiber material, a surface-treated product (surface-treated by a silane coupling agent and a sizing agent to enhance adhesion thereof with the base resin), such as glass fiber, carbon fiber, or aramid fiber, can be suitably used. A content of the reinforcing fiber material within the resin composition is 10 wt % or more and 40 wt % or less of the total resin composition, more preferably 15 wt % to 30 wt %.

Figure 3A:
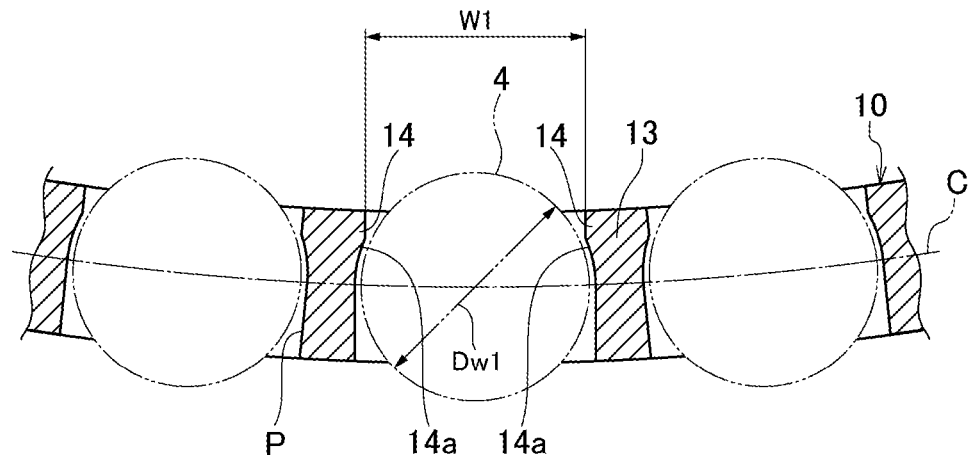
FIG. 3A is a sectional view taken along a line III-III in FIG. 1
Figure 3B:
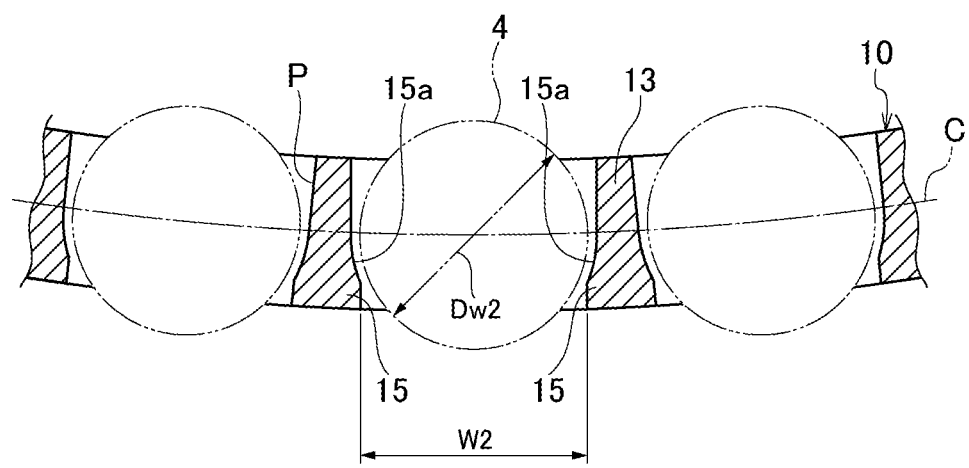
FIG. 3B is a sectional view taken along a line III'-III' in FIG. 1.

Also, the pillar portion 13 has cross-section shapes in a large-diameter ring portion-near portion and a small-diameter ring portion-near portion thereof, which are different from each other and changed to one another in the middle of the pillar portion 13. Namely, the large-diameter ring portion-near portion of the pillar portion 13 shown in FIG. 3A has a protrusion 14 provided with a conical surface 14a on an inner diameter side relative to a pitch circle C of the tapered rollers 4. Also, the small-diameter ring portion-near portion of the pillar portion 13 shown in FIG. 3B has a protrusion 15 provided with a conical surface 14a on an outer diameter side relative to the pitch circle C of the tapered rollers 4. Curvatures of the conical surfaces 14a, 15a are set to be slightly larger than a curvature of the tapered roller 4.

To put the tapered rollers 4 and the resin cage 10 together, an opening width W1 of each pocket on the radially inner side at the protrusions 14 of the pillar portions 13 near the large-diameter ring portion is smaller than the diameter Dw1 of the roller on the large-diameter side of the roller, and an opening width W2 of each pocket on the radially outer side at the protrusions 15 of the pillar portions 13 near the small-diameter ring portion is smaller than the diameter Dw2 of the roller on a small-diameter side of the roller.

Table 1 shows results of tests with respect to roller insertability and roller retainability performed while an overlap width (Dw1−W1) in the protrusion 14 of the pillar portion 13 near the large-diameter ring portion and an overlap width (Dw2−W2) in the protrusion 15 of the pillar portion 13 near the small-diameter ring portion are varied between 0.1 mm and 0.7 mm by 0.1 mm. Other conditions are the same. In the table, ○○ (double circle) represents a case where both the roller insertability and the roller retainability are good, ○ represents a case where one of roller insertability and roller retainability is lower than in the case of ○○ but is practically allowable, and a blank column represents that the test is not performed.

From these results, it can be found that the overlap width (Dw1−W1) at the protrusion 14 of the pillar portion 13 near the large-diameter ring portion is preferably 0.2 mm to 0.7 mm and the overlap width (Dw2−W2) at the protrusion 15 of the pillar portion 13 near the small-diameter ring portion is preferably 0.1 mm to 0.5 mm. In particular, in view of favorably balancing the roller insertability and the roller retainability, the overlap width (Dw1−W1) at the protrusion 14 of the pillar portion 13 near the large-diameter ring portion is preferably 0.2 mm to 0.6 mm and the overlap width (Dw2−W2) at the protrusion 15 of the pillar portion 13 near the small-diameter ring portion is preferably 0.1 mm to 0.3 mm.

TABLE 1

| | overlap width (mm) | | | | | | |
|---|---|---|---|---|---|---|---|
| | 0.1 | 0.2 | 0.3 | 0.4 | 0.5 | 0.6 | 0.7 |
| protrusion 14 near large-diameter ring portion | | ○○ | ○○ | ○○ | ○○ | ○ | ○ |
| protrusion 15 near small-diameter ring portion | ○○ | ○○ | ○○ | ○ | ○ | | |

In addition, as shown in FIG. 1, an annular notch 16 is formed on an inner peripheral surface of the large-diameter ring portion 11 such that the thickness $t_1$ of the large-diameter ring portion 11 is smaller than the thickness t of the pillar portion 13, and an inner peripheral surface of the cage 10 is formed in a stepped shape from the pillar portion 13 to the large-diameter ring portion 11. The notch 16 is formed by notching a portion of the pillar portion 13 along a radial direction. Thus, the thickness of the large-diameter ring portion 11 is thinned and also the protrusion 14 of the pillar portion 13 is partially cut, so that an elastic deformation amount of the large-diameter ring portion side of the pillar portion 13 is increased, thereby allowing the tapered roller 4 to be easily inserted from an inner side of the cage 10. Further, the large flange 3b of the inner ring 3 can be inserted in the annular notch 16 and correspondingly, a size of the flange 3b can be increased, thereby enhancing loadability against an axial load. In addition, the notch 16 is formed by notching a part of the pillar portion 13 along the radial direction, so that an interference with the large flange 3b can be prevented.

Also, as shown in FIG. 1, an inclination angle $\alpha_2$ of an outer peripheral surface of the cage 10 relative to the rotation axis of the tapered roller bearing 1 is equal to or greater than 32°30' but smaller than 55°, corresponding to the contact angle α of the tapered roller bearing 1, preferably 32°30' to 54°.

Then, the above test results were reexamined on internal specifications of good Examples 2 to 5, and effects received from each of specifications were verified in view of further downsizing. Also, basic dynamic load rating ratios described in Table 3 are values which are obtained by comparing with Comparative example 1 under the assumption that a basic dynamic load rating of Comparative example 1 is 1. In Table 3, ⊚ (double circle) represents a case which is practically allowable and provides good result, ○ represent a case which provides a performance inferior to ⊚ but is practically allowable, and x represents a case which provides poor result. If comprehensively judging the results of Table 3, it can be found that, as in Examples 6 to 9, the moment rigidity and the long life can be achieved when the contact angle satisfies the requirements of the present invention, and also further downsizing or an enhanced strength of the large flange can be achieved when Lw/B, Dw1/H, and (D1−d)/2H satisfy the requirements of the invention.

TABLE 3

| | H/d | contact angle α | Lw/B | Dw1/H | (D1 − d) 2H | basic dynamic load rating ratio | moment rigidity | life | downsizing | large flange strength |
|---|---|---|---|---|---|---|---|---|---|---|
| Comparative Example 1 | 0.11 | 27° 30' | 0.58 | 0.51 | 0.49 | 1.00 | x | x | ⊚ | x |
| Example 6 | | 45° | 0.96 | 0.46 | 0.80 | 0.97 | ⊚ | ⊚ | ⊚ | ⊚ |
| Example 7 | | 42° 30' | 0.94 | 0.48 | 0.77 | 1.04 | ⊚ | ⊚ | ⊚ | ○ |
| Example 8 | | 40° | 0.93 | 0.51 | 0.74 | 1.11 | ⊚ | ⊚ | ⊚ | ○ |
| Example 9 | | 37° 30' | 0.93 | 0.54 | 0.72 | 1.17 | ○ | ○ | ⊚ | ○ |

The tapered roller bearing 1 of the present embodiment is preferably used in a back-to-back combination (DB combination) as a bearing arrangement to obtain high moment rigidity. In addition, a long-life steel, on which a special heat treatment (carbonitriding or carburizing) is performed, is preferably used for the tapered roller bearing 1, because if a preload is increased, moment rigidity is enhanced, but a bearing life could be reduced.

Herein, the moment rigidity and the life were compared while varying the contact angle upon a load condition of a bearing basic dynamic load rating (Cr)×20% or more to 60% or less. In Table 2, ⊚ (double circle) represents a case which is practically allowable and provides good result, ○ represent a case which provides a performance inferior to ⊚ but is practically allowable, Δ (triangle) represents a case which provides a performance inferior to ○ but is practically allowable, and x represents a case which provides poor result. From the results of Table 2, it can be found that high moment rigidity and a long life can be obtained by setting the contact angle to 37°30' to 50°.

TABLE 2

| | contact angle α | moment rigidity | life |
|---|---|---|---|
| Example 1 | 50° | ⊚ | ⊚ |
| Example 2 | 45° | ⊚ | ⊚ |
| Example 3 | 42° 30' | ⊚ | ⊚ |
| Example 4 | 40° | ⊚ | ⊚ |
| Example 5 | 37° 30' | ○ | ○ |
| Comparative Example 1 | 27° 30' | x | x |

Figure 4:
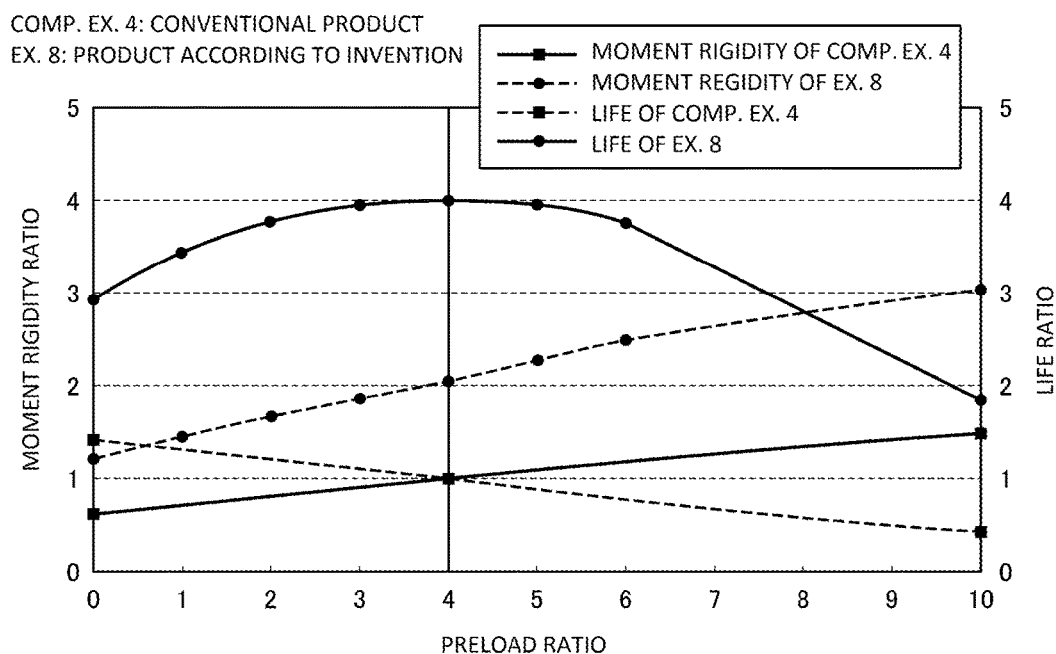
FIG. 4 is a graph showing moment rigidity and life of tapered roller bearings according to the present embodiment and the related art.

Further, moment rigidity ratio and life ratio of the product according to the invention (Example 6) in each preload ratio are shown in Table 4 and FIG. 4, with the moment rigidity and the life of the tapered roller bearing of a conventional product (Comparative Example 1) being 1 when the preload ratio is 4. Here, the term preload ratio means a value, which when a certain value of a preload is set to '1', is represented as a ratio relative to '1'. Also, a preload ratio, which is represented as '0', is 0 N.

TABLE 4

| | H/d | contact angle α | Lw/ B | Dw1/ H | (D1 − d) 2H | when preload ratio is 4 | |
|---|---|---|---|---|---|---|---|
| | | | | | | moment rigidity | life |
| Conventional Product (Comparative Example 1) | 0.11 | 27° 30' | 0.58 | 0.51 | 0.49 | 1 | 1 |
| Invented Product (Example 6) | | 45° | 0.96 | 0.46 | 0.8 | 2.1 | 4 |

As shown in FIG. 4, when the preload ration is 4, a moment rigidity ratio of the tapered roller bearing of the product according to the invention (Example 6) to the conventional product (Comparative Example 1) is 2.1 and a life ratio thereof to Comparative example 1 is 4. Also, it can be found that, even in any preload ratios, the tapered roller bearing of the product according to the invention (Example 6) exhibits higher values in moment rigidity ratio and lift ratio than those of the conventional product (Comparative Example 1).

As described above, according to the tapered roller bearing 1 of the present embodiment, the inner ring 3 has the large flange 3b formed on the end portion of the inner ring on the large-diameter side of the inner ring, the inner ring raceway surface 3a continuously extends to the end face 3c of the inner ring 3 on the small-diameter side of the inner ring 3, and also the contact angle α is 45°. Therefore, moment rigidity is improved and the roller length can be made longer to have increased load capacity, thereby achieving high moment rigidity and long life. In addition, the moment rigidity can be enhanced by setting the contact angle α to a range of 37°30' to 50°, and if the contact angle α is set to be in a range of 37°30' to 50° when a distance between bearings is short, in particular a distance between bearings is equal to or smaller than four times of the assembly width T of bearings, this is especially effective in enhancing the moment rigidity of bearings Further, because a ratio between a height (D1−d)/2 of the inner ring on the large flange side thereof and a radial cross-section thickness H is set such that 0.7<(D1−d)/2H<0.9, when d being the inner diameter of the tapered roller bearing 1 and D1 being the outer diameter of the inner ring, and the large flange can be backed up, thereby greatly enhancing strength of the large flange 3b.

In addition, because a ratio between a roller length Lw and the width B of the inner ring is set such that 0.8<Lw/B<1.2, downsizing can be achieved and load capacity can be increased, thereby obtaining high moment rigidity and a long life.

Also, because a ratio between the radial cross-section thickness H and the inner diameter d is set such that 0.05<H/d<0.15, a compact structure having a thin radial thickness can be achieved.

Additionally, because a ratio between the diameter Dw1 of the tapered roller on the large-diameter side of the tapered roller and the radial cross-section thickness H is set such that 0.3<Dw1/H<0.6, downsizing can be achieved and load capacity can be increased, thereby obtaining high moment rigidity and a long life.

Also, the annular notch 16 is formed on the inner peripheral surface of the large-diameter ring portion 11 such that the thickness $t_1$ of the large-diameter ring portion 11 is smaller than the thickness t of the pillar portion 13. Therefore, an elastic deformation amount of the pillar portion 13 of the cage 10 is increased, thereby allowing the tapered roller 4 to be easily inserted from an inner side of the cage 10.

Further, the pillar portions 13 are formed such that, at the protrusions 14 near the large-diameter ring portion, an overlap width is 0.2 mm to 0.7 mm so that the opening width W1 of the pocket P on the radially inner side is smaller than the diameter Dw1 of the tapered roller 4 on the large-diameter side of each tapered roller, and at the protrusions 15 near the small-diameter ring portion, an overlap width is 0.1 mm to 0.5 mm so that an opening width W2 of the pocket P on the radially outer side is smaller than the diameter Dw2 of the tapered roller 4 on the small-diameter side of the tapered roller. Therefore, insertability and retainability of the tapered roller 4 into the cage 10 is improved. The cage 10 of the present invention is not limited to injection-molding using an axial draw mold, that is, the pillar portion 13 may be formed such that, in at least a part of the inner diameter side of the pocket P, the overlap width is 0.2 mm to 0.7 mm so that the opening width W1 of the pocket P on the radially inner side is smaller than the diameter Dw1 of the tapered roller 4 on the large-diameter side of the tapered roller, and such that, in at least a part of the outer diameter side of the pocket P, the overlap width is 0.1 mm to 0.5 mm so that the opening width W2 of the pocket P on the radially outer side is smaller than the diameter Dw2 of the tapered roller 4 on the small-diameter side of the tapered roller.

Also, because an inclination angle $\alpha_2$ of the cage 10 is equal to or greater than 32°30' but smaller than 55°, the cage 10 is applicable to a tapered roller bearing 1 that is steeply inclined to have a contact angle α of 37°30' to 50°.

As described above, the tapered roller bearing 1 of the present embodiment is configured such that the smaller flange of the inner ring is not provided and the roller length is increased correspondingly to achieve high moment rigidity and long life. In order to satisfy these, the present embodiment sets an overlap width of the cage 10 so that a roller retention performance of the cage 10 can be enhanced, thereby realizing an integration of the tapered roller 4 and the cage 10. Thus, instead of the smaller flange of the inner ring which otherwise performs a function of retaining the taper roller 4, the cage 10 employed in the tapered roller bearing 1 of the present embodiment provides this function, and thus falling out of rollers of the tapered roller bearing 1 that is steeply inclined to have a contact angle of 37°30' to 50° can be effectively prevented.

Figure 5:
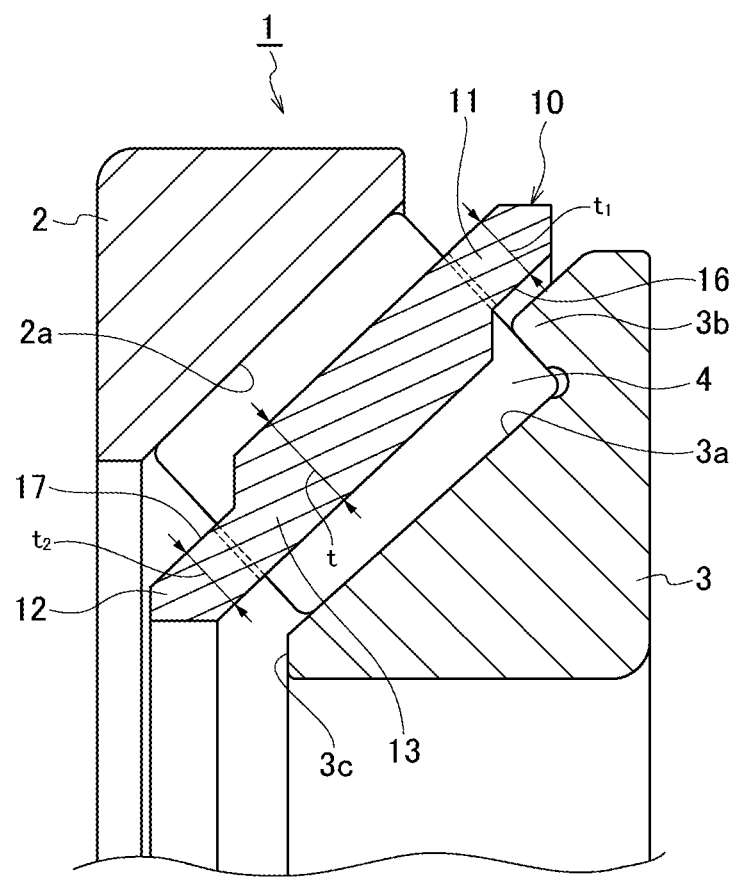
FIG. 5 is an enlarged longitudinal sectional view showing a main part of a variant of the tapered roller bearing of the first embodiment.

While the annular notch 16 is formed on the inner peripheral surface of the large-diameter ring portion 11 in the embodiment described above, according to the present invention, the annular notch may be formed on at least one of the inner peripheral surface of the large-diameter ring portion 11 and the outer peripheral surface of the small-diameter ring portion 12. For example, as in a variant shown in FIG. 5, annular notches 16 and 17 may be formed on both the inner peripheral surface of the large-diameter ring portion 11 and the outer peripheral surface of the small-diameter ring portion 12, such that the thicknesses $t_1$ and $t_2$ of the respective ring portions 11, 12 are smaller than the thickness of the pillar portion 13, thereby allowing the tapered roller 4 to be easily inserted from either side of the cage 10.

Second Embodiment

Next, a tapered roller bearing according to a second embodiment of the present invention will be described in detail with reference to the drawings. Portion that are the same as or similar to those of the first embodiment are denoted by the same signs and the description thereof will be simplified or omitted.

Figure 6:
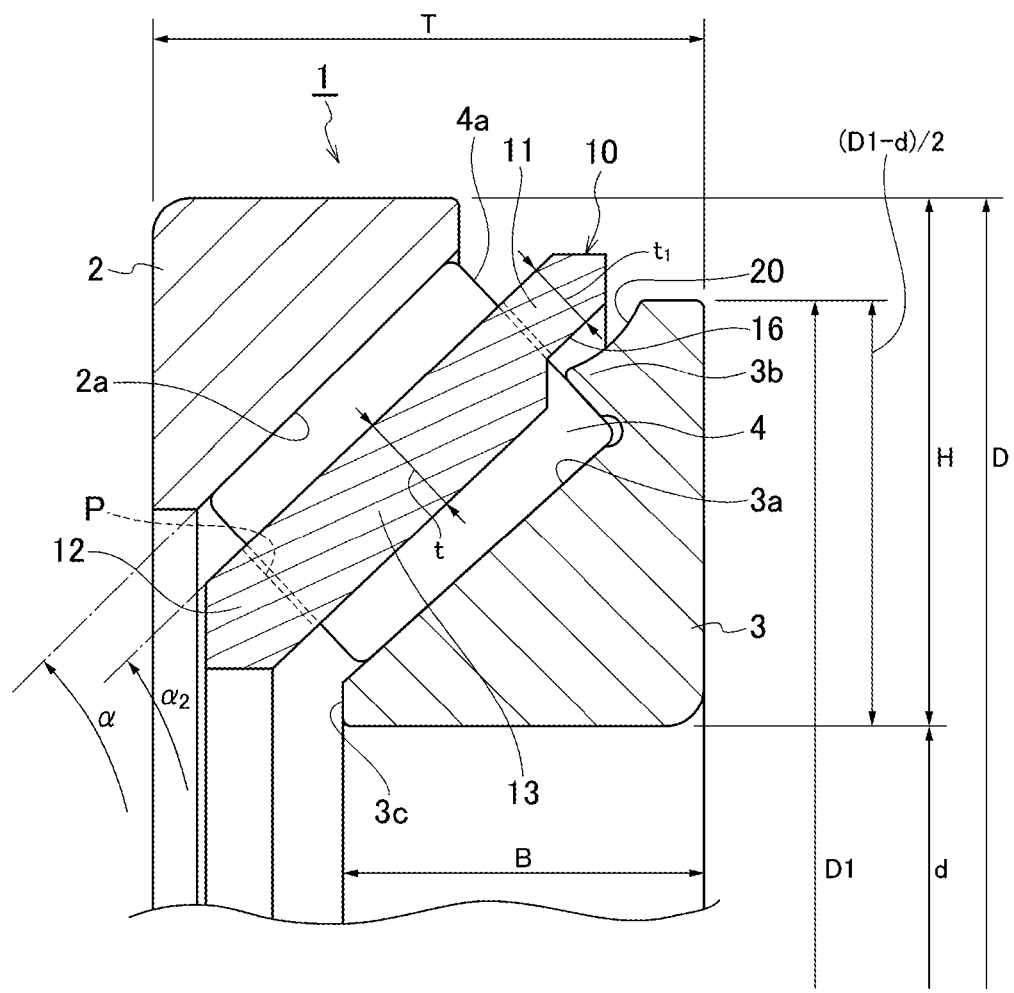
FIG. 6 is a sectional view of a tapered roller bearing according to a second embodiment of the invention.
Figure 7:
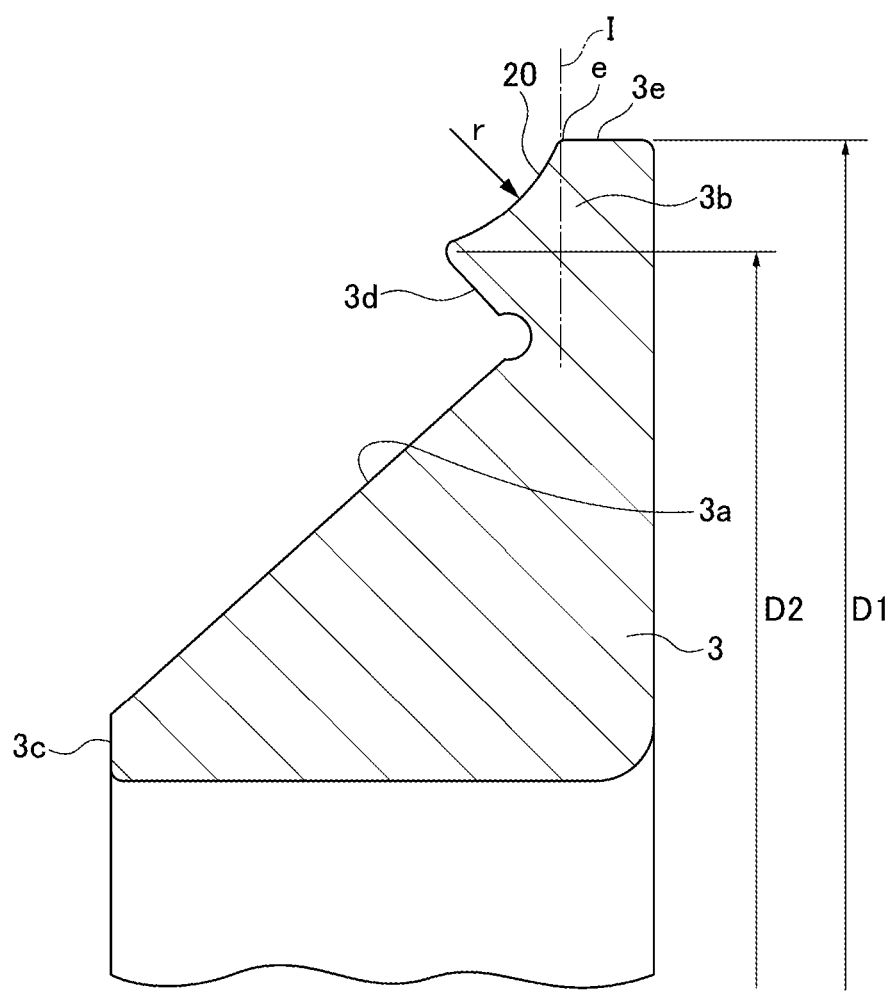
FIG. 7 is a sectional view of an inner ring in FIG. 6.

In the second embodiment, as shown in FIGS. 6 and 7, a large flange 3b of an inner ring 3 has a recessed portion 20 at a location facing a large-diameter ring portion 11 of a cage 10, in particular, at the location facing a notch 16 in the present embodiment, between a flange surface 3d of the large flange that contacts a larger end face 4a of a tapered roller 4 and a radially outer surface 3e of the large flange, which is a cylindrical surface having a diameter larger than the diameter of the flange surface 3d of the large flange at the radially outermost point on the flange surface 3d of the large flange (position represented by the diameter D2). Therefore, an interference between the large flange 3b and the large-diameter ring portion 11 of the cage 10 can be prevented, thereby inhibiting damage of the cage 10 due to wear thereof. In addition, because the recessed portion 20 is provided on the large flange 3b, a thickness of the large-diameter ring portion 11 of the cage 10 can be maximally increased, thereby enhancing strength of the cage 10. Also, lubricant can be held in the recessed portion 20, thereby improving lubrication on the flange surface 3d of the large flange of the inner ring 3. In particular, a space for holding the lubricant can be increased by the notch 16 and the recessed portion 20. As the lubricant, grease or lubricating oil can be used, and in the case of lubricating oil, a lubricating oil having a higher viscosity is employed because the lubricating oil is relatively easily held in the recessed portion 20.

The recessed portion 20 has a generatrix shape which is formed by a curved surface, the curved surface being a single arc having a curvature radius r. While a boundary between the radially outer surface 3e of the large flange (position represented by a diameter D1) and the recessed portion 20 and a boundary between the radially outermost point (position represented by the diameter D2) on the flange surface 3d of the large flange and the recessed portion 20 are chamfered, such chamfering is optional. To ensure strength of the large flange 3b, the recessed portion 20 is formed axially inward of a virtual plane I, the virtual plane I being perpendicular to the rotation axis and including an edge line e (represented by a point e in the sectional view of FIG. 3) at which the recessed portion 20 and the radially outer surface 3e of the large flange meet each other.

Considering a balance between lubricant holding ability and the strength of the large flange 3b, the generatrix shape of the recessed portion 20 formed by a single arc is preferably set such that the curvature radius r is r≥(D1−D2)/2, D1 being the outer diameter of the inner ring, i.e., the diameter of the radially outer surface 3e of the large flange, and D2 being the diameter of the flange surface 3d of the large flange at the radially outermost point on the flange surface 3d.

Figure 8:
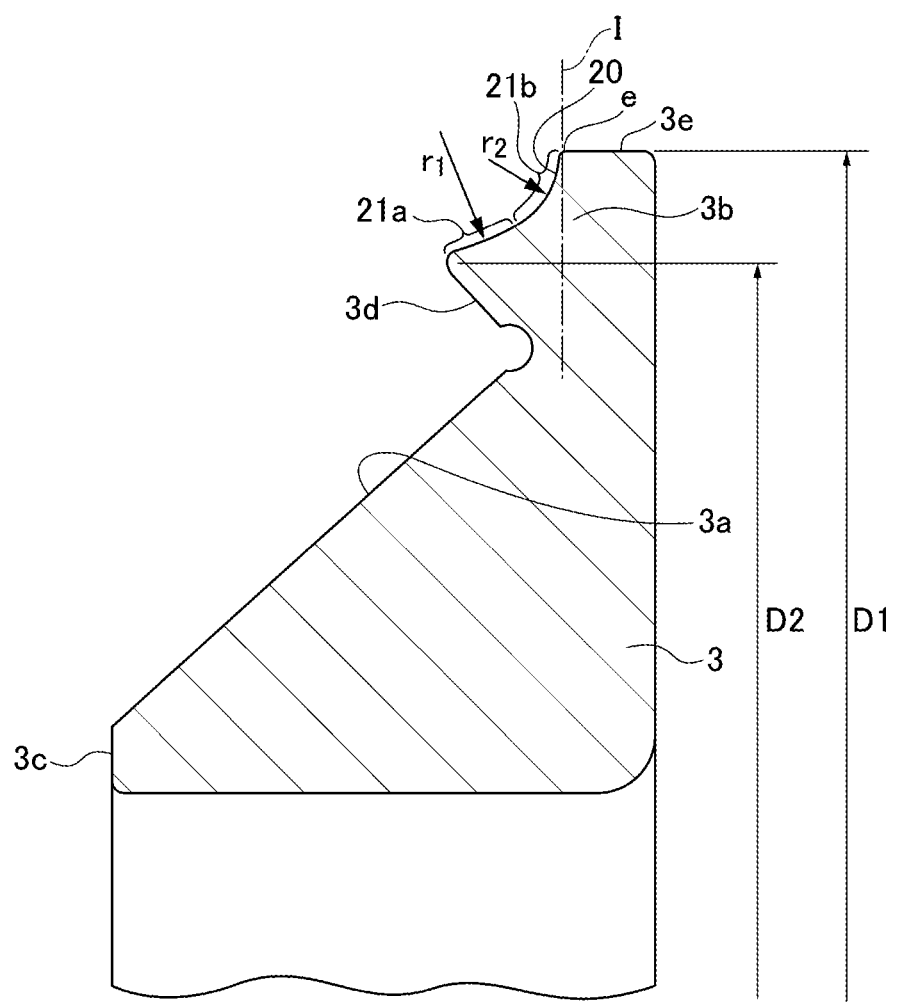
FIG. 8 is a sectional view of an inner ring of a tapered roller bearing according to a first variant of the second embodiment.

While the recessed portion 20 is formed by a single arc in view of easy machining, the recessed portion 20 is not limited to this, and may be formed by a curved surface including a plurality of arcs 21a, 21b having curvature radiuses r1, r2 as shown in FIG. 8, or may be formed by a stepped surface.

Figure 9A:
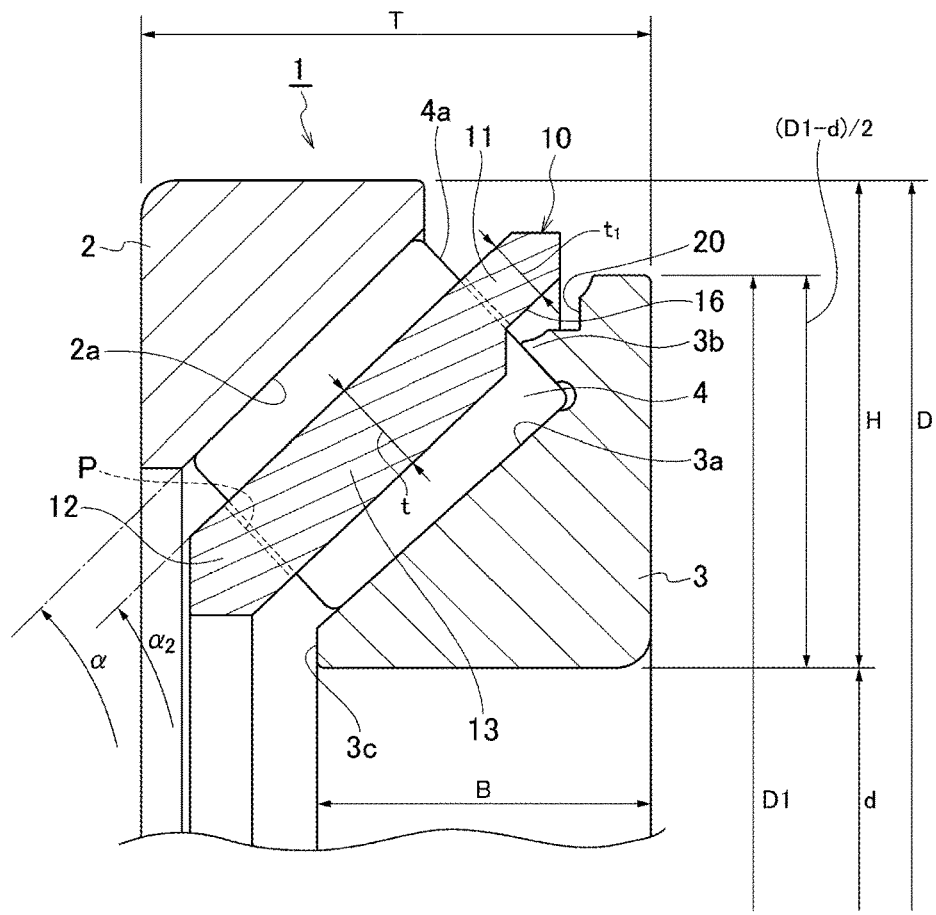
FIG. 9A is a sectional view of a tapered roller bearing according to a second variant of the second embodiment and FIG. 9B is a partially enlarged view of an inner ring thereof.
Figure 9B:
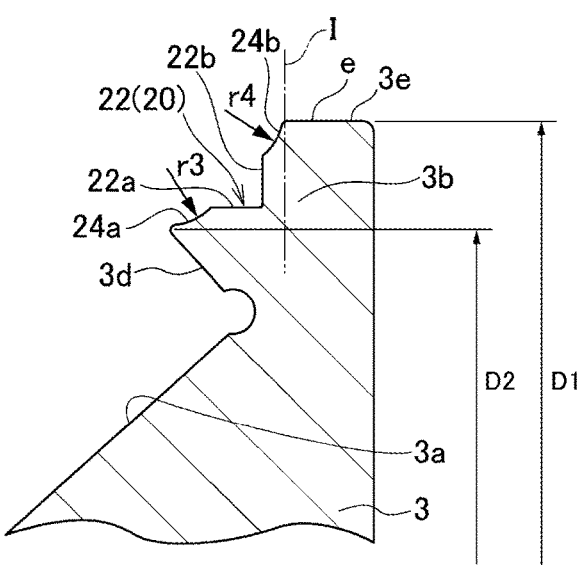

FIG. 9 is a variant in which the recessed portion 20 includes a stepped surface 22 and two curved surfaces 24a, 24b, which are formed by arcs having curvature radiuses r3, r4. The stepped surface 22 has a cylindrical surface 22a near the flange surface of the large flange and an annular flat surface 22b near the radially outer surface of the large flange and extending radially outward from the cylindrical surface 22a. Even in this variant, a boundary between the radially outer surface 3e of the large flange (position represented by a diameter D1) and the recessed portion 20 and a boundary between the radially outermost point (position represented by the diameter D2) on the flange surface 3d of the large flange and the recessed portion 20 are also chamfered, but shapes of such chamfers are optional, and also a boundary between the cylindrical surface 22a and the annular flat surface 22b may be formed in a curved surface shape. Curvatures radiuses r3, r4 of two curved surfaces 24a, 24b may be mutually the same.

As described above, according to the tapered roller bearing 1 of the present embodiment, the inner ring 3 has the large flange 3b formed on the end portion of the inner ring on the large-diameter side of the inner ring, and the large flange 3b has the recessed portion 20 at a location facing the large-diameter ring portion 11 of the cage 10, and therefore the strength of the cage 10 can be improved while preventing an interference between the large flange 3b and the cage 10, and also lubricant can be held in the recessed portion 20 to improve lubrication on the flange surface 3d of the large flange of the inner ring 3.

In addition, the recessed portion 20 is formed between the flange surface 3d of the large flange that contacts the larger end face 4a of the tapered roller 4 and the radially outer surface 3e of the large flange having a diameter larger than the diameter of the flange surface 3d of the large flange at the radially outermost point on the flange surface 3d, and may be formed by a curved surface, a stepped surface, or a combination of the curved surface and the stepped surface.

Also, when the recessed portion 2 is a curved surface, the generatrix shape of the recessed portion 20 may be formed by a single arc or a plurality of arcs 21a and 21b. In particular, when the recessed portion 20 is formed by a single arc, the generatrix shape of the recessed portion 20 is configured such that the curvature radius r is r≥(D1−D2)/2, D1 being the diameter of the radially outer surface 3e of the large flange, and D2 being the diameter of the flange surface 3d of the large flange at the radially outermost point on the flange surface 3d, thereby achieving both lubricant holding ability and the strength of the large flange.

The recessed portion 20 is formed axially inward of the virtual plane I perpendicular to the rotation axis and including the edge line e at which the recessed portion 20 and the radially outer surface 3e of the large flange meet each other, so that the strength of the large flange 3b is ensured.

Further, when the recessed portion 20 is formed by a stepped surface 22 and the two curved surfaces 24a, 24b as shown in FIG. 9, the stepped surface 22 is configured to have the cylindrical surface 22a near the flange surface 3d of the large flange and the annular flat surface 22b near the radially outer surface 3e of the large flange and extending radially outward from the cylindrical surface 22a, so that more lubricant can be held.

Figure 10A:
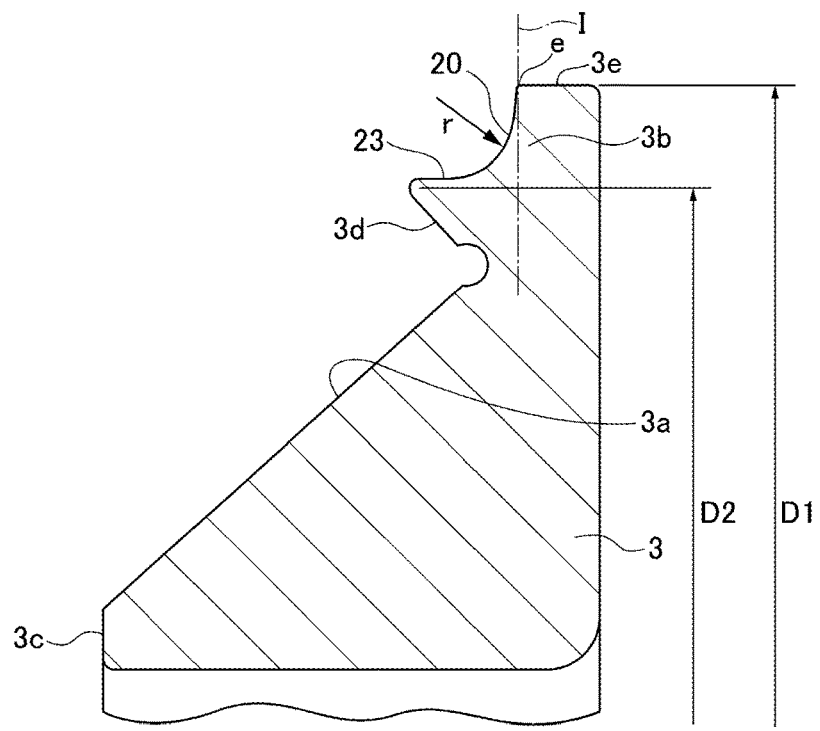
FIG. 10A is a sectional view of a tapered roller bearing according to a third variant of the second embodiment.
Figure 10B:
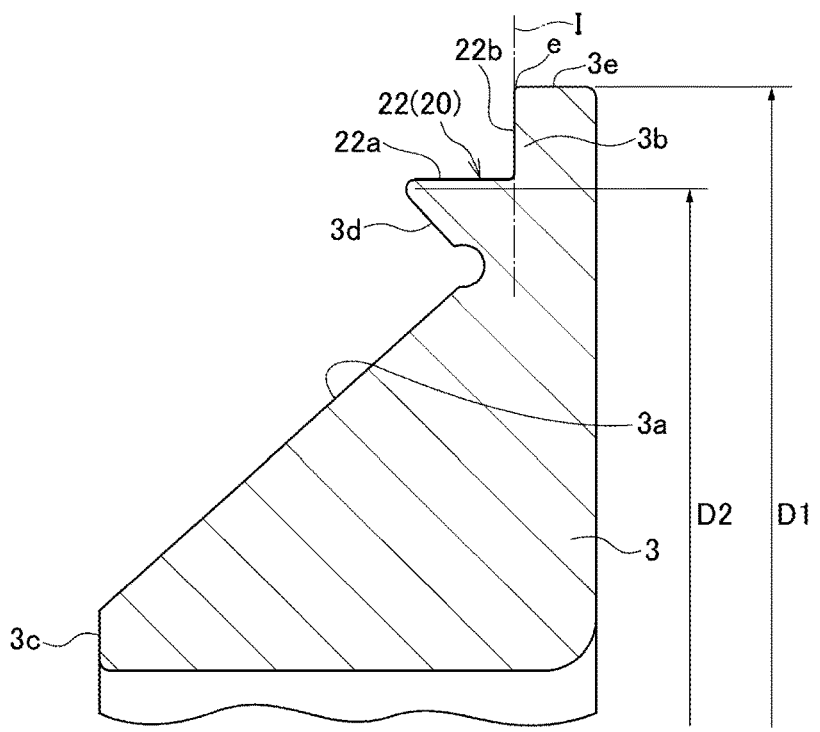
FIG. 10B is a sectional view of a tapered roller bearing according to a fourth variant of the second embodiment.

For example, in the inner ring 3 according to a variant shown in FIG. 10A, a recessed portion 20 formed by a curved surface may be formed after optionally chamfering from the radially outermost point on the flange surface 3d of the large flange and then a cylindrical surface 23 extending along an axial direction is formed. Alternatively, in the inner ring 3 according to a variant shown in FIG. 10B, after optionally chamfering from the radially outermost point on the flange surface 3d of the large flange, a recessed portion 20 may be formed by a stepped surface having a cylindrical surface 22a connected to the flange surface 3d of the large flange and an annular flat surface 22b connected to the radially outer surface 3e of the large flange. Thus, more lubricant can be held therein.

Also, the inner ring 3 may be configured such that the radially outer surface 3e of the large flange is not formed by a cylindrical surface, but by the outmost diameter portion of the recessed portion 20.

The present invention is not limited to the embodiments described above, and changes and modifications made be made therein as appropriate.

The tapered roller bearing of the present invention can be applied to a variety of reducers, such as industrial robot, conveyors and motor applications, and specific applications thereof will be described below.

Application Example 1

Figure 11:
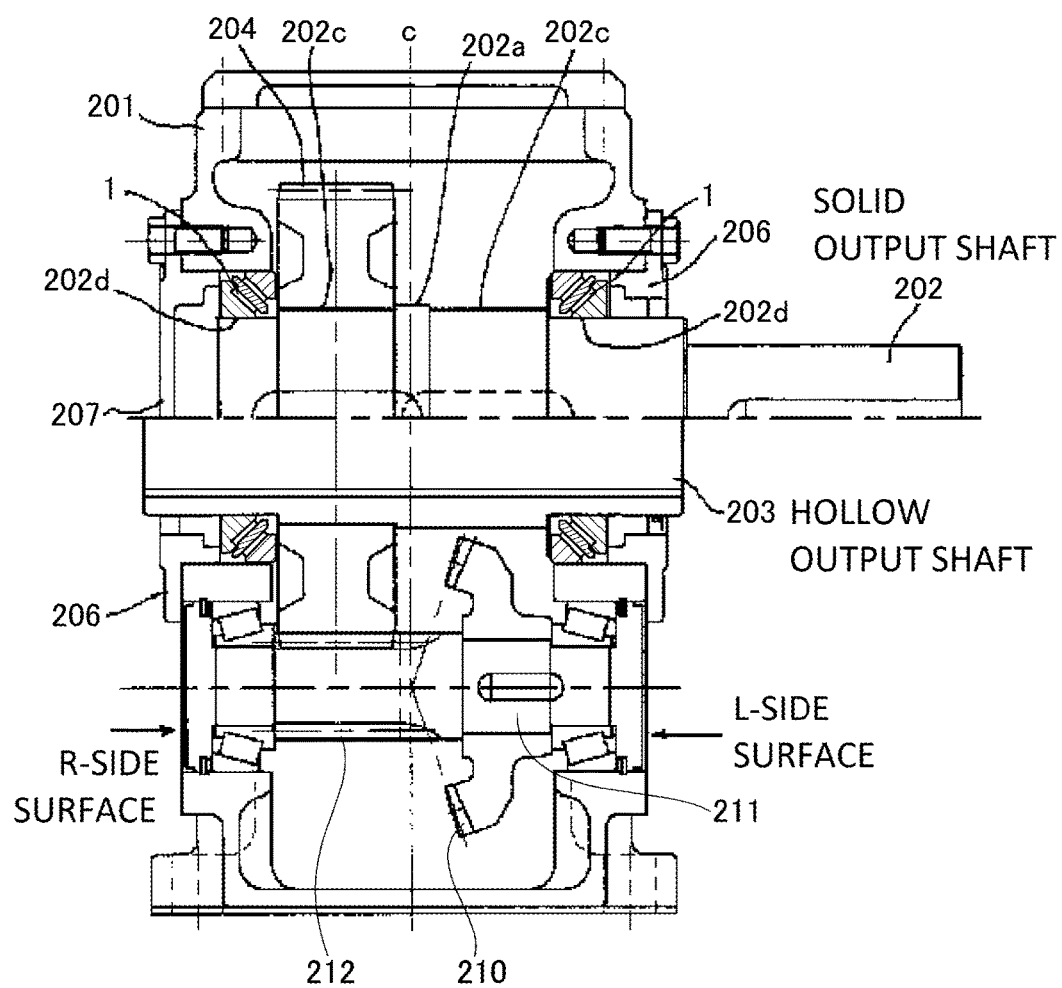
FIG. 11 is a longitudinal sectional view of an orthogonal axis gear reducer, to which the tapered roller bearing of the present invention is applied.

FIG. 11 is a longitudinal sectional view of an orthogonal axis gear reducer, to which the tapered roller bearing of the present invention is applied. The orthogonal axis gear reducer is mounted on a gear reducer combined with a motor to be used in a material handling equipment or the like and is centered on both of a L side (a left side of the reducer as viewed from an input side) and a R side, and herein, FIG. 11 is an example in which centering is performed on the L side.

In FIG. 11, a reference sign 201 denotes a gear box accommodating reduction gears. A reference sign 202 denotes a solid output shaft centered on the L side, and the reference sign 203 denotes a hollow output shaft. FIG. 11 shows a case of using the solid output shaft 202 in an upper half thereof and a case of using the hollow output shaft 203 in a lower half thereof. The gear box 201 is configured in a bilateral symmetry relative to the center line c and thus has exactly the same shapes and dimensions on both sides. Left and right output shaft centering portions are adapted so that an output shaft cover 206 or 207 is fixed to the gear box 201 by bolt fastening. A centering hole is machined in only the output shaft cover 206 on the centering side.

In FIG. 11, the solid output shaft 202 is supported on both sides thereof by the tapered roller bearings 1 of the present invention, which are fitted into the gear box 201, and is provided with a pair of output gear fitting portions 202c for fitting output gears 204 on both sides with a largest diameter middle portion 202a interposed therebetween. Further, diameters of fitting portions 202d of the tapered roller bearings are equal to that of the solid output shaft 202, and the case of the hollow output shaft 203 shown in the lower half of FIG. 11 is also the same.

In addition, a shaft 211 for supporting a bevel gear 210 engaged with a bevel pinion, not shown, is provided with a pinion 212. The output shaft 204 is engaged with the pinion 21 and thus, a power transmitted to the bevel gear 210 is transmitted to the output shafts 202, 203.

Application Example 2

Figure 12:
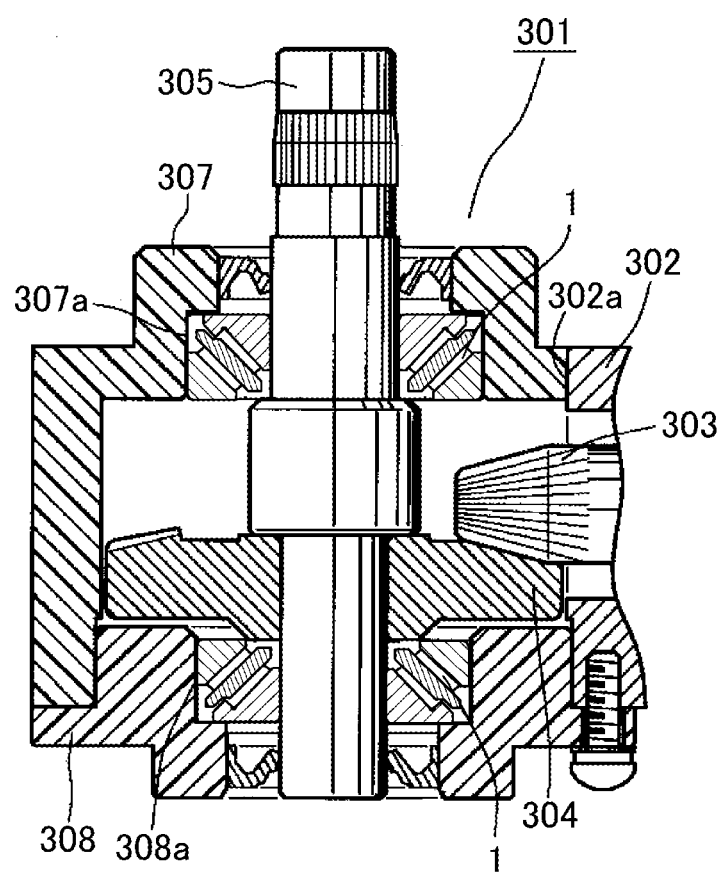
FIG. 12 is an enlarged sectional side view of a reducer unit in an electric motor having a hypoid-type reducer, to which the tapered roller bearing of the present invention is applied.
Figure 13:
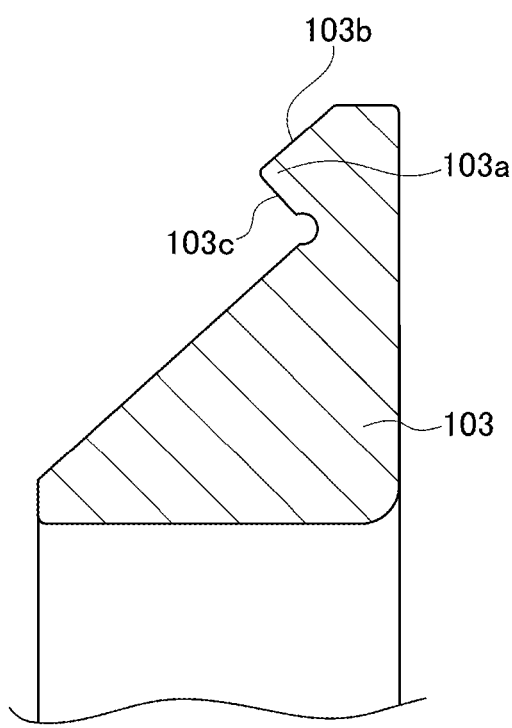
FIG. 13 is a sectional view showing an inner ring of a tapered roller bearing cited as a reference example.

FIG. 12 is an enlarged sectional side view of a reducer unit in an electric motor having a hypoid-type reducer, to which the tapered roller bearing of the present invention is applied.

In FIG. 12, a reducer 301 is attached on a flange surface 302a of a bearing bracket 302 of an electric motor. The internal structure of the reducer 301 includes a hypoid gear 304 engaged with a pinion 303 extended out of the electric motor, a spindle 305 attached to extend through the center portion of the hypoid gear 304, two tapered roller bearings 1 for rotatably supporting the spindle 305, and casings 307, 308 formed in two pieces and having receiving portions 307a, 308a for receiving the tapered roller bearings 1.

In the tapered roller bearings 1 used in Application Example 1 and Application Example 2 the outer diameter of the outer ring is 650 mm or less and the inner diameter of the inner ring is 500 mm or less. By using the tapered roller bearing is of the present invention, even either of Application examples can bear an axial load and a radial load, which are acted on the output shafts 202, 203 and the spindle 305, while having a compact design. Further, as shown in FIGS. 11 and 12, moment rigidity can be enhanced by attaching the tapered roller bearings 1 of the invention in a back-to-back combination. In addition, to obtain high moment rigidity, it is advantages to employ a roller bearing, rather than a ball bearing, and in particular, because a tapered roller bearing has a structure in which extension lines of rolling surfaces of the rollers and extension lines of outer and inner ring raceway surfaces are intersected with each other at one point on a rotation axis, a sliding between the roller rolling surfaces and the outer and inner ring raceway surface is hardly occurred, thereby obtaining a higher reliability relative to a cylindrical roller bearing.

The present application is based on Japanese Patent Application No. 2012-280994 filed on Dec. 25, 2012, Japanese Patent Application No. 2013-078999 filed on Apr. 4, 2013, and Japanese Patent Application No. 2013-241278 filed on Nov. 21, 2013, the entire contents of which are incorporated herein by reference.

EXPLANATION OF REFERENCE SIGNS 1 tapered roller bearing
2 outer ring
2a outer ring raceway surface
3 inner ring
3a inner ring raceway surface
3b large flange
3d flange surface of large flange
3e radially outer surface of large flange
4 tapered roller
4a larger end face
10 resin cage for tapered roller bearing
11 large-diameter ring portion
12 small-diameter ring portion
13 pillar portion
14, 15 protrusion
14a, 15a conical surface
20 recessed portion
stepped surface
B width of inner ring
C pitch circle of tapered rollers
D outer diameter
D1 outer diameter of inner ring (diameter of radially outer surface of large flange)
D2 diameter of flange surface of large flange at radially outermost point
Dw1 diameter of roller on large-diameter side
H radial cross-section thickness
Lw roller length
P pocket
T assembly width
d inner diameter
e edge line
r Curvature radius
$\alpha$ contact angle
$\alpha_2$ inclination angle of the cage

The invention claimed is:
1. A tapered roller bearing comprising:
an outer ring having an outer ring raceway surface on an inner peripheral surface thereof;
an inner ring having an inner ring raceway surface on an outer peripheral surface thereof; and
a plurality of tapered rollers arranged in a rollable manner between the outer ring raceway surface and the inner ring raceway surface,
wherein the inner ring comprises a large-diameter side and a small-diameter side, a flange being formed on an end portion of the inner ring on the large-diameter side of the inner ring, and
wherein a contact angle $\alpha$ of the tapered roller bearing is 37°30' to 50°, wherein a ratio between a height (D1−d)/2 of the inner ring on the flange side and a radial cross-section thickness H of the tapered roller bearing is set such that $0.7 < (D1-d)/2H < 0.9$, wherein d is an inner diameter of the tapered roller bearing and D1 is an outer diameter of the inner ring.
2. A tapered roller bearing comprising:
an outer ring having an outer ring raceway surface on an inner peripheral surface thereof:
an inner ring having an inner ring raceway surface on an outer peripheral surface thereof; and a plurality of tapered rollers arranged in a rollable manner between the outer ring raceway surface and the inner ring raceway surface, wherein the inner ring comprises a large-diameter side and a small-diameter side, a flange being formed on an end portion of the inner ring on the large-diameter side of the inner ring, and wherein a contact angle α of the tapered roller bearing is 37°30' to 50°, wherein a ratio between a roller length Lw and a width B of the inner ring is set such that 0.8<Lw/B<1.2.

3. A tapered roller bearing comprising:

an outer ring having an outer ring raceway surface on an inner peripheral surface thereof;

an inner ring having an inner ring raceway surface on an outer peripheral surface thereof; and a plurality of tapered rollers arranged in a rollable manner between the outer ring raceway surface and the inner ring raceway surface, wherein the inner ring comprises a large-diameter side and a small-diameter side, a flange being formed on an end portion of the inner ring on the large-diameter side of the inner ring, and wherein a contact angle α of the tapered roller bearing is 37°30' to 50°, wherein a ratio between a radial cross-section thickness H of the tapered roller bearing and an inner diameter d of the tapered roller bearing is set such that 0.05<H/d<0.15.

4. The tapered roller bearing according to claim 3, wherein a ratio between a diameter Dw1 of each tapered roller on a large-diameter side of each tapered roller and a radial cross-section thickness H of the tapered roller bearing is set such that 0.3<Dw1/H<0.6.

5. The tapered roller bearing according to claim 3, further comprising a resin cage, the cage comprising a large-diameter ring portion, a small-diameter ring portion, the large-diameter ring portion and the small-diameter ring portion being spaced from each other in an axial direction, and a plurality of pillar portions connecting the large-diameter ring portion and the small-diameter ring portion to each other, thereby forming a plurality of pockets to accommodate and to retain the plurality of tapered rollers, wherein at least one of an inner peripheral surface of the large-diameter ring portion and an outer peripheral surface of the small-diameter ring portion is formed with an annular notch such that a thickness of the ring portion is smaller than a thickness of each pillar portion.

6. The tapered roller bearing according to claim 5, wherein the annular notch is formed on the inner peripheral surface of the large-diameter ring portion, and wherein the flange is arranged to extend into the annular notch.

7. The tapered roller bearing according to claim 3, further comprising a resin cage, the cage comprising a large-diameter ring portion, a small-diameter ring portion, the large-diameter ring portion and the small-diameter ring portion being spaced from each other in an axial direction, and a plurality of pillar portions connecting the large-diameter ring portion and the small-diameter ring portion to each other, thereby forming a plurality of pockets to accommodate and to retain the plurality of tapered rollers, wherein the pillar portions are formed such that:

in at least a part of a radially inner side of each pocket, an overlap width is 0.2 mm to 0.7 mm so that an opening width of each pocket on the radially inner side is smaller than a diameter of each tapered roller on a large-diameter side of each tapered roller, and in at least a part of a radially outer side of each pocket, an overlap width is 0.1 mm to 0.5 mm so that an opening width of each pocket on the radially outer side is smaller than a diameter of each tapered roller on a small-diameter side of each tapered roller.

8. The tapered roller bearing according to claim 3, further comprising a resin cage, the cage comprising a large-diameter ring portion, a small-diameter ring portion, the large-diameter ring portion and the small-diameter ring portion being spaced from each other in an axial direction, and a plurality of pillar portions connecting the large-diameter ring portion and the small-diameter ring portion to each other, thereby forming a plurality of pockets to accommodate and to retain the plurality of tapered rollers, wherein an inclination angle of the cage is equal to or greater than 32° 30' but smaller than 55°.

* * * * *